United States Patent
Wu et al.

(10) Patent No.: US 12,281,746 B2
(45) Date of Patent: Apr. 22, 2025

(54) FOLDABLE SUPPORT AND ELECTRONIC DEVICE

(71) Applicant: HONOR DEVICE CO., LTD., Shenzhen (CN)

(72) Inventors: Ling Wu, Shenzhen (CN); Feng Tang, Shenzhen (CN); Guoliang Huo, Shenzhen (CN); Desen Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/035,907

(22) PCT Filed: Sep. 8, 2022

(86) PCT No.: PCT/CN2022/117737
§ 371 (c)(1),
(2) Date: May 8, 2023

(87) PCT Pub. No.: WO2023/109206
PCT Pub. Date: Jun. 22, 2023

(65) Prior Publication Data
US 2024/0344653 A1    Oct. 17, 2024

(30) Foreign Application Priority Data
Dec. 16, 2021    (CN) .......................... 202111539892.9

(51) Int. Cl.
*F16M 11/38*    (2006.01)
*F16M 11/10*    (2006.01)

(52) U.S. Cl.
CPC ............. *F16M 11/38* (2013.01); *F16M 11/10* (2013.01)

(58) Field of Classification Search
CPC ......... F16M 11/38; F16M 11/10; H04M 1/04; G06F 1/16
See application file for complete search history.

(56) References Cited

U.S. PATENT DOCUMENTS

| | | |
|---|---|---|
| 8,943,649 B2 | 2/2015 | Chen et al. |
| 9,244,497 B2 | 1/2016 | Tsai |
| (Continued) | | |

FOREIGN PATENT DOCUMENTS

| | | |
|---|---|---|
| CN | 201667044 U | 12/2010 |
| CN | 102853227 A | 1/2013 |
| (Continued) | | |

*Primary Examiner* — Anita M King
(74) *Attorney, Agent, or Firm* — WOMBLE BOND DICKINSON (US) LLP

(57) ABSTRACT

This application provides a foldable support and an electronic device. The foldable support includes a bottom plate, a first support plate, a second support plate, a first magnetic member, and a second magnetic member: the first support plate is connected to the bottom plate; the second support plate is connected to the first support plate; and the first magnetic member is arranged on the first support plate, the second magnetic member is arranged on the second support plate, and the first magnetic member is configured to attract the second magnetic member in a case that an included angle between the first support plate and the bottom plate is less than a preset angle, and is further configured to repel the second magnetic member in a case that the included angle between the first support plate and the bottom plate is greater than or equal to the preset angle.

20 Claims, 10 Drawing Sheets

(56) References Cited

U.S. PATENT DOCUMENTS

| | | | |
|---|---|---|---|
| 9,451,822 B2 * | 9/2016 | Gu | F16M 11/041 |
| 9,851,748 B2 * | 12/2017 | Senatori | G06F 1/1679 |
| 9,864,402 B1 | 1/2018 | Liang et al. | |
| 9,921,610 B2 | 3/2018 | Lu et al. | |
| 10,061,348 B2 | 8/2018 | Shen et al. | |
| 10,645,329 B2 | 5/2020 | Lai et al. | |
| 10,664,012 B1 * | 5/2020 | Zimmerman | G06F 1/1632 |
| 10,936,018 B2 | 3/2021 | Kao et al. | |
| 11,162,636 B2 * | 11/2021 | Chen | F16M 13/022 |
| 11,181,948 B1 * | 11/2021 | Tsuchihashi | F16M 11/38 |
| 11,567,542 B2 * | 1/2023 | Miller | F16C 11/04 |
| 2002/0071246 A1 | 6/2002 | Stewart | |
| 2014/0376180 A1 * | 12/2014 | Chen | G06F 1/1681 361/679.55 |
| 2015/0293564 A1 * | 10/2015 | Gu | A45C 11/00 361/679.55 |
| 2021/0089077 A1 | 3/2021 | Wang et al. | |
| 2022/0133039 A1 * | 5/2022 | Zhai | G06F 1/1626 248/455 |
| 2023/0400055 A1 * | 12/2023 | Yang | F16C 11/04 |

FOREIGN PATENT DOCUMENTS

| | | |
|---|---|---|
| CN | 203102104 U | 7/2013 |
| CN | 104252202 A | 12/2014 |
| CN | 104279221 A | 1/2015 |
| CN | 106557121 A | 4/2017 |
| CN | 107957746 A | 4/2018 |
| CN | 108287593 A | 7/2018 |
| CN | 108700911 A | 10/2018 |
| CN | 110580082 A | 12/2019 |
| CN | 211018883 U | 7/2020 |
| CN | 111781991 A | 10/2020 |
| CN | 212460429 U | 2/2021 |
| CN | 112540645 A | 3/2021 |
| CN | 113124042 A | 7/2021 |
| CN | 213598394 U | 7/2021 |
| CN | 213954149 U | 8/2021 |
| CN | 215072508 U | 12/2021 |
| CN | 113932133 A | 1/2022 |
| JP | 2010085479 A | 4/2010 |
| JP | 3176541 U | 6/2012 |

* cited by examiner

FOLDABLE SUPPORT AND ELECTRONIC DEVICE

CROSS-REFERENCE TO RELATED APPLICATIONS

This application is a national stage of International Application No. PCT/CN2022/117737, filed on Sep. 8, 2022, which claims priority to Chinese Patent Application No. 202111539892.9, filed on Dec. 16, 2021. The disclosures of both of the aforementioned applications are hereby incorporated by reference in their entireties.

TECHNICAL FIELD

This application relates to the field of electronic device accessory technologies, and in particular, to a foldable support and an electronic device.

BACKGROUND

With the development of technologies, electronic devices such as tablet computers and mobile phones are favored by more and more people because of the portability thereof. A foldable support is configured to place a tablet computer or a mobile phone, which can facilitate people to use the tablet computer or the mobile phone more conveniently. The foldable support needs to have a larger operating space that can be operated by a user, so as to improve usage experience of the user. How to increase an operable space that can be operated by the user on a basis of ensuring that the foldable support has good support performance is a topic that the industry continues to explore.

SUMMARY

Embodiments of this application provide a foldable support and an electronic device, which can increase an operable space that can be operated by a user on a basis of ensuring that the foldable support has good support performance.

According to a first aspect, this application provides a foldable support, including:
- a bottom plate;
- a first support plate and a second support plate, where the first support plate is connected to the bottom plate, the first support plate is capable of rotating relative to the bottom plate, the second support plate is connected to the first support plate, the second support plate is capable of rotating relative to the first support plate, and the second support plate is configured to match an external structural member to support the first support plate; and
- a first magnetic member and a second magnetic member, where the first magnetic member is arranged on the first support plate, the second magnetic member is arranged on the second support plate, and the first magnetic member is configured to attract the second magnetic member in a case that an included angle between the first support plate and the bottom plate is less than a preset angle, to enable the second support plate to be fitted with the first support plate; and the first magnetic member is further configured to repel the second magnetic member in a case that the included angle between the first support plate and the bottom plate is greater than or equal to the preset angle, to enable the second support plate and the first support plate to be arranged at an included angle.

It may be understood that the bottom plate may be an independent carrier structure that can carry a keyboard and a mobile terminal, which may be understood as a stationary part of the foldable support in a closed state, an unfolded state, and an intermediate state between the closed state and the unfolded state.

The first support plate can rotate relative to the bottom plate to the closed state in which the first support plate is fitted with the bottom plate, to enable the foldable support to be in the closed state. When the foldable support is in the closed state, a plane size of the foldable support is relatively small, which is convenient for the user to store and carry. Exemplarily, when the foldable support is in the closed state, the first support plate and the bottom plate can be completely folded to be parallel to each other (where a slight deviation is also allowed). The first support plate can also rotate relative to the bottom plate to be close to each other (folded) or away from each other (unfolded) to the intermediate state, to enable the foldable support to be in the intermediate state, where the intermediate state may be any state between the unfolded state and the closed state. Exemplarily, when the foldable support is in the intermediate state, the included angle between the first support plate and the bottom plate may be 30°, 45°, 60°, or the like. The first support plate can also rotate relative to the bottom plate to the unfolded state, to enable the foldable support to be in the unfolded state, where the unfolded state may be understood as a support state that can provide good support performance for the mobile terminal. When the foldable support is in the unfolded state, the foldable support can be configured to carry and support the mobile terminal. Therefore, the foldable support has an excellent support effect, and has better stability. The mobile terminal may be placed on the first support plate, so that the first support plate provides good retention stability for the mobile terminal. Exemplarily, when the foldable support is in the unfolded state, the included angle between the first support plate and the bottom plate may be 125°, 130°, 135°, or the like.

The second support plate may rotate to a state of being fitted with the first support plate, and may also rotate to a state of being arranged with the first support plate at an included angle to match the external structural member to jointly support the first support plate. By arranging the second support plate and enabling the second support plate to match the external structural member to support the first support plate, when the foldable support is in the unfolded state, the first support plate can open relative to the bottom plate to carry a device such as the mobile terminal, and the second support plate can also open relative to the first support plate and support between the external structural member and the first support plate, so that the second support plate, the first support plate, and the external structural member can jointly form a triangular structure. Because of better stability and a good capability of resisting interference of external environmental factors, the triangular structure is easier to support the device such as the mobile terminal, and can effectively prevent the device from slipping off the foldable support, so that the foldable support can realize better support performance and retention stability.

In addition, by arranging that the second support plate matches the external structural member to support the first support plate, the second support plate can be structurally in a rear support form located behind the first support plate. On the one hand, the support performance of the second support plate can be realized without occupying a plate surface space of the bottom plate, and a problem in which, in the prior art, because a center of gravity of the unfolded state of the foldable support is controlled in an interval where the bottom plate is located, a spatial layout of devices on the bottom plate is compressed to affect an overall support effect and stability of the foldable support can be effectively avoided. On the other hand, a space jointly defined by the first support plate and the bottom plate can be released, and a layout space of the bottom plate can be transferred to a maximum extent, so that more or larger-area devices can be laid on the defined plate surface space of the bottom plate, and a purpose of increasing the operable space that is operated by the user can be realized, which is conducive to improving the space utilization rate of the foldable support.

Based on the above description, it should be understood that, when the foldable support is in the closed state, the first support plate is fitted with the bottom plate, and the second support plate is fitted with the first support plate, so that the foldable support is in a folded state as a whole; and when the foldable support is in the unfolded state, the first support plate and the bottom plate are arranged at an included angle, and the second support plate and the first support plate are also arranged at an included angle, so that the foldable support is in a stretched state as a whole.

The first magnetic member may be an electromagnet, and can generate a magnetic field after power-on. The first magnetic member may be electrically connected to a first circuit when the included angle between the first support plate and the bottom plate is less than the preset angle, so as to generate magnetism that attracts that of the second magnetic member when power-on, thereby enabling the first support plate and the second support plate to be close to each other to be folded. The first magnetic member may also be electrically connected to a second circuit when the included angle between the first support plate and the bottom plate is greater than or equal to the preset angle, so as to generate magnetism that repels that of the second magnetic member when power-on, thereby enabling the first support plate and the second support plate to be away from each other to be unfolded. The preset angle may be 90°, 120°, or the like. The first circuit may be understood as a circuit that can realize attraction between the magnetism of the first magnetic member and the magnetism of the second magnetic member. The second circuit may be understood as a circuit that can realize repulsion between the magnetism of the first magnetic member and the magnetism of the second magnetic member.

That is, the first magnetic member is configured to attract the second magnetic member when the included angle between the first support plate and the bottom plate is less than the preset angle, to enable the second support plate to be fitted with the first support plate. The first magnetic member is further configured to repel the second magnetic member when the included angle between the first support plate and the bottom plate is greater than or equal to the preset angle, to enable the second support plate and the first support plate to be arranged at an included angle.

In other words, when the included angle between the first support plate and the bottom plate is less than the preset angle, the second support plate is fitted with the first support plate, and only the first support plate and the bottom plate are arranged at an included angle. In this case, the foldable support may be in the closed state, and may also be in the intermediate state between the closed state and the unfolded state. When the included angle between the first support plate and the bottom plate is greater than or equal to the preset angle, the second support plate is separated from the first support plate, and the first support plate and the bottom plate, and the first support plate and the second support plate each are arranged at an included angle. In this case, the foldable support may be in the unfolded state, and may also be in the intermediate state between the closed state and the unfolded state.

In a possible implementation, the foldable support further includes a rotary mechanism, the first support plate is rotatably connected to the bottom plate through the rotary mechanism, and the rotary mechanism has a first conductive contact point; and the first conductive contact point is configured to conduct with the first magnetic member in a case that the included angle between the first support plate and the bottom plate is less than the preset angle, to enable magnetism of the first magnetic member to attract that of the second magnetic member.

It should be noted that the rotary mechanism may be any rotary shaft mechanism that can realize switching of the magnetism of the first magnetic member and accompanies with a sense of damping, such as a rotary shaft mechanism of a concave gear/cam type, a wrapped rotary shaft mechanism, or a CLIP rotary shaft mechanism, which is not strictly limited in the technical solutions of this application.

In a possible implementation, the foldable support further includes a rotary mechanism, the first support plate is rotatably connected to the bottom plate through the rotary mechanism, and the rotary mechanism has a second conductive contact point; and the second conductive contact point is configured to conduct with the first magnetic member in a case that the included angle between the first support plate and the bottom plate is the preset angle, to enable magnetism of the first magnetic member to repel that of the second magnetic member.

It should be noted that, the rotary mechanism may be any rotary shaft mechanism that can realize switching of the magnetism of the first magnetic member and accompanies with a sense of damping, such as a rotary shaft mechanism of a concave gear/cam type, a wrapped rotary shaft mechanism, or a CLIP rotary shaft mechanism, which is not strictly limited in the technical solutions of this application.

In a possible implementation, the rotary mechanism includes a first support, a second support, and a first rotary shaft, the first support is connected to the bottom plate, the second support is connected to the first support plate, a first end of the first rotary shaft is connected to the first support, a second end of the first rotary shaft is connected to the second support, and the second support is capable of rotating relative to the first support.

The first support is connected to the bottom plate, so as to be always stationary in the closed state, the unfolded state, and the intermediate state between the closed state and the unfolded state of the foldable support. It should be noted that, a key design of this application does not lie in an implementation form of the connection between the first support and the bottom plate, and a specific structure and a position of the connection between the first support and the bottom plate are not strictly limited.

The first rotary shaft can perform a rotation movement together with the second support, and the first rotary shaft can rotate relative to the first support. The first rotary shaft includes the first end and the second end, the first end is an end of the first rotary shaft connected to the first support, and the second end is an end of the first rotary shaft connected to the second support.

The second support is connected to the first support plate, to synchronously move under driving of the first support plate. The second support is fixedly connected to the first rotary shaft. That is, the second support and the first rotary shaft can realize linkage. When the second support performs a rotation movement, the first rotary shaft is driven to synchronously perform the rotation movement. It should be noted that, a key design of this application does not lie in an implementation form of the connection between the second support and the first support plate, and a specific structure and a position of the connection between the second support and the first support plate are not strictly limited.

In a possible implementation, the rotary mechanism further includes a cam, a shaft sleeve, and a conductive structure, the cam is sleeved to the first end of the first rotary shaft, the cam is capable of being driven by the first rotary shaft to rotate, the shaft sleeve is sleeved to a periphery of the cam, the first conductive contact point and the second conductive contact point are arranged on an inner surface of the shaft sleeve, the conductive structure is connected to a peripheral side surface of the cam, and the conductive structure is configured to conduct with the first conductive contact point or the second conductive contact point.

It may be understood that the first conductive contact point is electrically connected to the first magnetic member, and the first conductive contact point is electrically connected to the first circuit. The first conductive contact point is configured to conduct with the first magnetic member when the included angle between the first support plate and the bottom plate is less than the preset angle, to enable the magnetism of the first magnetic member to attract that of the second magnetic member. The second conductive contact point is electrically connected to the second magnetic member, and the second conductive contact point is electrically connected to the second circuit. The second conductive contact point is configured to conduct with the first magnetic member when the included angle between the first support plate and the bottom plate is the preset angle, to enable the magnetism of the first magnetic member to repel that of the second magnetic member.

When the first conductive contact point and the second conductive contact point are not in contact with the conductive structure on the cam, because the first conductive contact point and the second conductive contact point are breakpoints, the first circuit and the second circuit cannot conduct. When the cam rotates to that the conductive structure thereon is in contact with the first conductive contact point or the second conductive contact point, the first circuit or the second circuit conducts.

When the first support plate rotates relative to the bottom plate and the included angle between the first support plate and the bottom plate is less than the preset angle, the conductive structure on the cam is in contact with the first conductive contact point to enable the first circuit to conduct, so as to enable the magnetism generated by the first magnetic member to attract the magnetism generated by the second magnetic member, thereby enabling the first support plate to be fitted with the second support plate. When the first support plate rotates relative to the bottom plate and the included angle between the first support plate and the bottom plate is greater than or equal to the preset angle, the conductive structure on the cam is separated from the first conductive contact point and is in contact with the second conductive contact point to enable the second circuit to conduct, so as to enable the magnetism generated by the first magnetic member to repel the magnetism generated by the second magnetic member, thereby enabling the second support plate to open relative to the first support plate, enabling the second support plate, the first support plate, and the external structural member to form a stable support angle, and enabling the foldable support to realize an opened state. When the first support plate rotates again relative to the bottom plate and the included angle between the first support plate and the bottom plate is less than or equal to the preset angle, the conductive structure on the cam is separated from the second conductive contact point and is in contact with the first conductive contact point to enable the first circuit to conduct, so as to enable the magnetism generated by the first magnetic member to attract the magnetism generated by the second magnetic member, thereby enabling the first support plate to be fitted with the second support plate, and enabling the foldable support to realize the closed state.

In a possible implementation, the rotary mechanism further includes a concave gear, the concave gear includes a body and a clamping body connected to the body, the body is sleeved to the first end of the first rotary shaft, and the body is in contact with the cam, and an end of the clamping body away from the body is clamped with the first support.

It may be understood that, in the closed state, the unfolded state, and the intermediate state between the closed state and the unfolded state of the foldable support, the first support is always stationary, and because the cam is clamped with the first support, the cam can be limited to rotating along a circumferential direction of the first rotary shaft under an acting force of the first support, where the circumferential direction of the first rotary shaft is a direction surrounding a central axis of the first rotary shaft. In other words, in a rotating process of the first rotary shaft, because of a clamping relationship with the first support, the cam can be limited to performing a rotation movement together with the first rotary shaft (where slight rotation is also allowed).

In a possible implementation, a protrusion is arranged on the cam, a groove is provided on the body of the concave gear, and the protrusion abuts against the groove.

It may be understood that the groove can match the protrusion to realize a similar meshing relationship between teeth and teeth, so as to realize close fit between the first support plate and the bottom plate in the closed state of the foldable support, and effectively minimize a possibility of a problem in which the first support plate and the bottom plate are not tightly closed in the closed state of the foldable support because the concave gear is in plane contact with the cam.

In a possible implementation, the rotary mechanism further includes a first elastic member and a fastener, the fastener is fixedly connected to the first end of the first rotary shaft, and the first elastic member is sleeved to the first end of the first rotary shaft, and elastically abuts between the fastener and the cam.

Therefore, the cam can be pushed to be in pressing contact with the concave gear because of good elasticity of the first elastic member, to ensure a damping effect that the cam and the concave gear can realize. It may be understood that, because the structure limits an axial movement and circumferential rotation of the concave gear so that only the cam has an axial movement space, and because the cam and the concave gear are always in good matching and contact, the cam can perform an axial movement along the first rotary shaft to compress or release the first elastic member under an acting force of the concave gear on the cam, thereby improving the damping effect, and improving usage experience of the user when folded.

In the rotating process of the first rotary shaft, the cam generates a relative movement with the concave gear, where the relative movement may be understood as that the cam is squeezed to slide relative to the concave gear along the first rotary shaft, so that an axial distance between the cam and the concave gear changes, to compress the first elastic member to generate a damping force. When the damping force brought by the first elastic member is greater than a gravity thereof, the foldable support may stop at a plurality of angles, that is, the foldable support may hover at different angles.

In a moving process of the cam along an axial direction, because the first elastic member is squeezed by the cam to be in a compressed state, a larger elastic force is applied to an end of the first elastic member away from the cam. Therefore, by arranging the fastener on this end, a problem in which the first elastic member falls off due to an excessive force can be resolved because of good retention stability between the fastener and the first rotary shaft, which is conducive to ensuring that a folding movement of the foldable support does not deflect, thereby having good reliability.

In a possible implementation, the rotary mechanism further includes a fastener sleeved to the first end of the first rotary shaft, a first friction member, and a first elastic member, the fastener is fixedly connected to the first end of the first rotary shaft, the first friction member is located between the fastener and the first elastic member, and the first elastic member elastically abuts between the first friction member and the cam.

It may be understood that, the first friction member can provide friction and damping for a rotating process of the foldable support, which is conducive to improving the rotation reliability of the foldable support. By arranging the first elastic member, the cam can be pushed to be in pressing contact with the concave gear because of good elasticity of the first elastic member, to ensure a damping effect that the cam and the concave gear can realize. It may be understood that, because the structure limits an axial movement and circumferential rotation of the concave gear so that only the cam has an axial movement space, and because the cam and the concave gear are always in good matching and contact, the cam can perform an axial movement along the first rotary shaft to compress or release the first elastic member under an acting force of the concave gear on the cam, thereby improving the damping effect, and improving usage experience of the user when folded.

In the rotating process of the first rotary shaft, the cam generates a relative movement with the concave gear, where the relative movement may be understood as that the cam is squeezed to slide relative to the concave gear along the first rotary shaft, so that an axial distance between the cam and the concave gear changes, to compress the first elastic member to generate a damping force. When the damping force brought by the first elastic member is greater than a gravity thereof, the foldable support may stop at a plurality of angles, that is, the foldable support may hover at different angles.

In a moving process of the cam along an axial direction, because the first elastic member is squeezed by the cam to be in a compressed state, a larger elastic force is applied to an end of the first elastic member away from the cam. Therefore, by arranging the fastener on this end, a problem in which the first elastic member falls off due to an excessive force can be resolved because of good retention stability between the fastener and the first rotary shaft, which is conducive to ensuring that a folding movement of the foldable support does not deflect, thereby having good reliability.

In a possible implementation, the rotary mechanism further includes a second friction member, and the second friction member is sleeved to the first end of the first rotary shaft, and is located between the concave gear and the first support.

It may be understood that the second friction member can provide friction and damping for a rotating process of the foldable support, which is conducive to improving the rotation reliability of the foldable support.

In a possible implementation, the first support plate includes a carrying surface and a support surface that face away from each other, the carrying surface is used for carrying a mobile terminal, an accommodation groove is provided on the support surface, and the accommodation groove is used for accommodating at least one part of the second support plate.

It may be understood that, when the accommodation groove is used for receiving a part of the second support plate, the second support plate may protrude relative to a support surface of the first support plate. When the accommodation groove is used for receiving all of the second support plate, a shape of the accommodation groove matches a shape of the second support plate, and a surface of the second support plate exposed to the outside may be flush with the support surface of the first support plate.

In this arrangement, when the foldable support is in the closed state, at least a part or all of the second support plate is located in the accommodation groove of the first support plate, so that the second support plate can present layout arrangement of being inserted into the first support plate, so that the storage of the second support plate can be realized on a basis of not occupying much space, the appearance performance is good, and the miniaturization of the foldable support can be realized more easily. When the foldable support is in the unfolded state, the second support plate can be arranged with the first support plate at an included angle, and abut between the external structural member and the first support plate, to form a support form of a rear support to match the external structural member to support the first support plate. The external structural member may be understood as a structural member that can place the foldable support, such as a book desk, an office desk, a bedside table, or a bed computer desk. When the foldable support is placed on the external structural member and is in the unfolded state, the first support plate, the second support plate, and the external structural member can jointly form a triangular structure, which is conducive to improving the support stability of the foldable support.

In a possible implementation, the foldable support includes a keyboard, and the keyboard is connected to the bottom plate.

It may be understood that the keyboard is connected to the bottom plate, to provide an operable space for the user through a larger plate surface interval of the bottom plate to a maximum extent, thereby having a high space utilization rate. Exemplarily, the keyboard and the bottom plate may be connected to form an integral structure. The key board and the bottom plate may be an integral structure formed in an assembly manner such as welding or bonding, or the keyboard and the bottom plate may also be an integral structure formed by a one-piece molding process. In addition, the keyboard may be connected to the mobile terminal in a wireless manner (such as Bluetooth or a wireless local area network), thereby realizing signal transmission therebetween. Alternatively, the keyboard may also be connected to the mobile terminal in a wired manner, thereby realizing signal transmission therebetween.

In a possible implementation, the foldable support further includes a second elastic member, and the second elastic member is elastically connected between the first support plate and the second support plate. Exemplarily, the second elastic member may be an elastic cloth.

It may be understood that, because the second elastic member is arranged between the first support plate and the second support plate, when the first support plate rotates relative to the bottom plate until the included angle between the first support plate and the bottom plate is the preset angle, the first support plate can continue to rotate relative to the bottom plate because of an elastic force of the second elastic member, so that the included angle between the first support plate and the bottom plate further increases, so as to adapt to a change of a viewing angle of the user when the mobile terminal is placed on the foldable support. In this implementation, when the first support plate rotates again relative to the bottom plate and the included angle between the first support plate and the bottom plate is less than or equal to the preset angle, the second elastic member has no elastic force, and the foldable support gradually realizes the closed state.

According to a second aspect, this application further includes an electronic device, the electronic device includes a mobile terminal and the foldable support described above, and the mobile terminal is connected to the foldable support.

DESCRIPTION OF EMBODIMENTS

For ease of understanding, terms related on which the embodiments of this application are first described:

The term "and/or" describes only an association relationship for describing associated objects and represents that three relationships may exist. For example, A and/or B may represent the following three cases: Only A exists, both A and B exist, and only B exists.

The term "a plurality of" refers to two or more.

The term "connection" should be understood in a broad sense. For example, a connection between A and B may be a direct connection between A and B, or an indirect connection between A and B by using an intermediary.

The following describes the specific implementations of this application in detail with reference to the accompanying drawings.

With the development of technologies, electronic devices such as tablet computers and mobile phones are favored by more and more people because of the portability thereof. A foldable support is configured to place a tablet computer or a mobile phone, which can facilitate people to use the tablet computer or the mobile phone more conveniently. The foldable support needs to have a larger operable space, so as to improve usage experience of a user.

Based on this, referring to FIG. 1 to FIG. 14, the embodiments of this application provide a foldable support 100 and an electronic device 200 to which the foldable support 100 is applied, which can increase an operable space that can be operated by the user on a basis of ensuring that the foldable support 100 has good support performance. Description is described below in detail.

Figure 1:
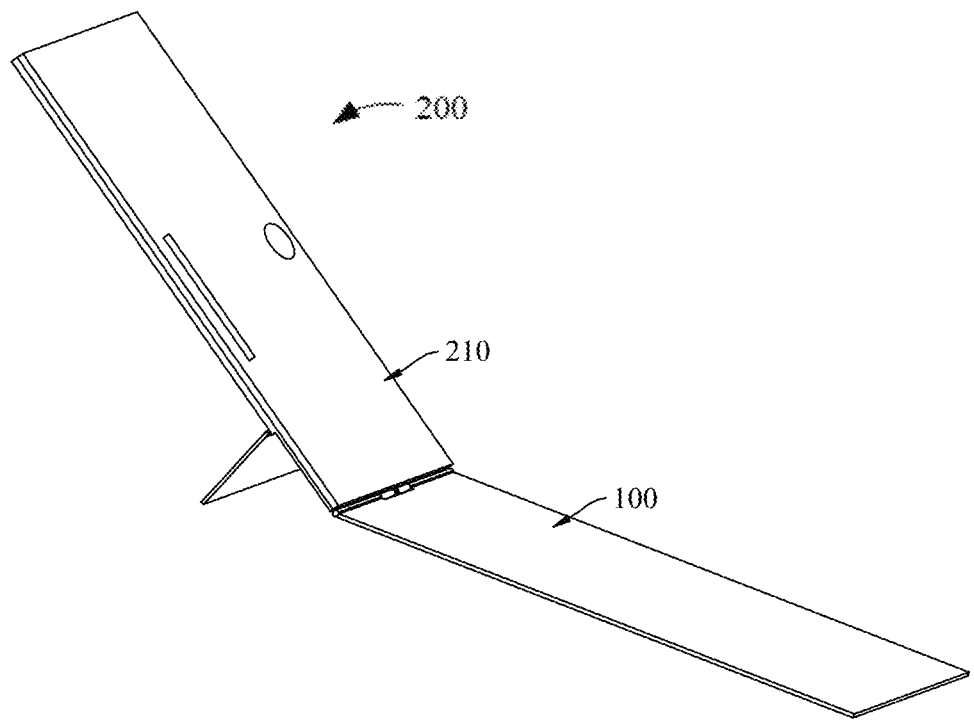
FIG. 1 is a schematic structural diagram of an electronic device according to an embodiment of this application.

Referring to FIG. 1, the electronic device 200 may include the foldable support 100 and a mobile terminal 210. The foldable support 100 can realize unfolding and closing under an operation of the user. When the foldable support 100 is in a closed state, a space occupied by the foldable support 100 decreases, which is convenient for storage. When the foldable support 100 is in an unfolded state, good support stability can be provided. The mobile terminal 210 is connected to the foldable support 100, so as to provide excellent retention stability for the mobile terminal 210 through good support performance of the foldable support 100. The mobile terminal 210 may be, but is not limited to, a tablet computer, a mobile phone, an e-book reader, and the like.

Exemplarily, a connection form between the mobile terminal 210 and the foldable support 100 may be magnetic connection, or the connection form between the mobile terminal 210 and the foldable support 100 may be clamping connection, or the connection form between the mobile terminal 210 and the foldable support 100 may be bonding. The connection form between the mobile terminal 210 and the foldable support 100 is not strictly limited in the embodiments of this application.

Figure 2:
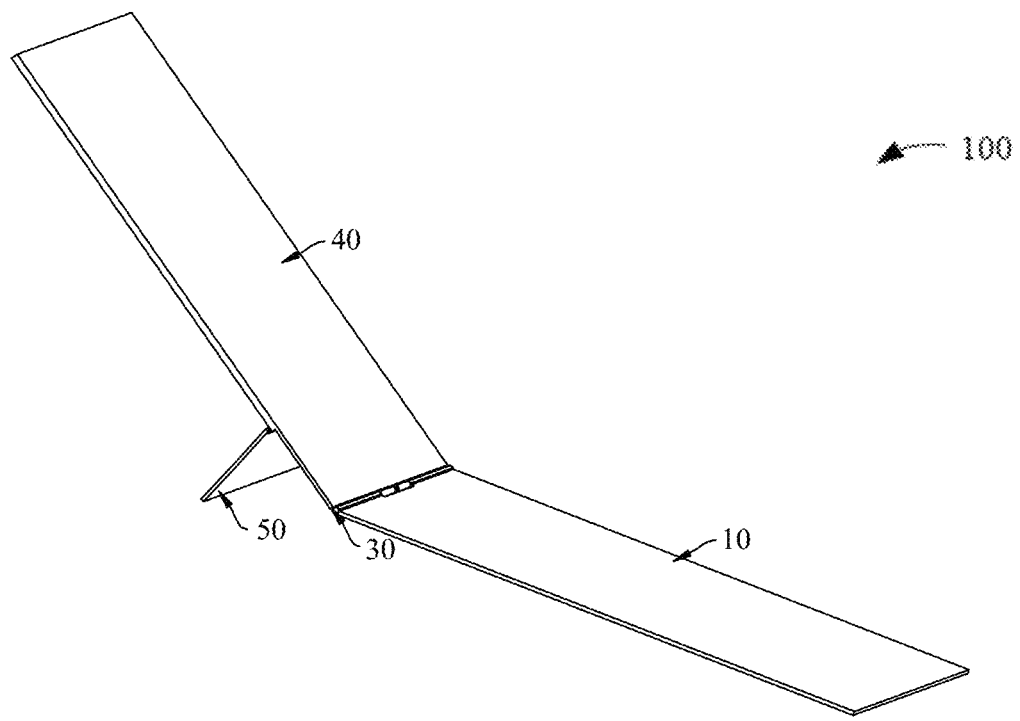
FIG. 2 is a schematic structural diagram of an angle of an unfolded state of a foldable support according to an embodiment of this application.
Figure 3:
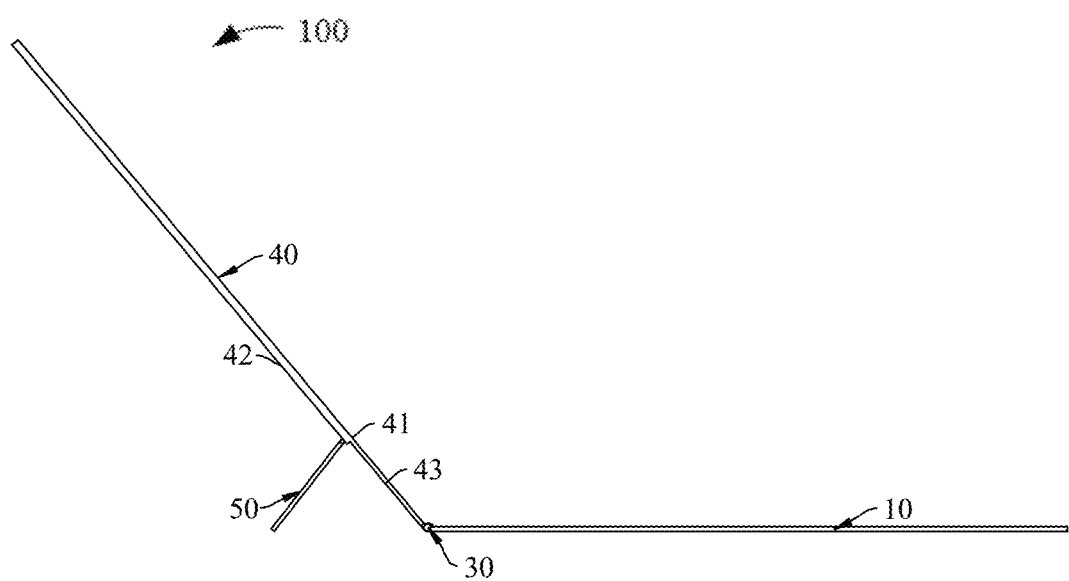
FIG. 3 is a schematic structural diagram of another angle of an unfolded state of a foldable support according to an embodiment of this application.
Figure 4:
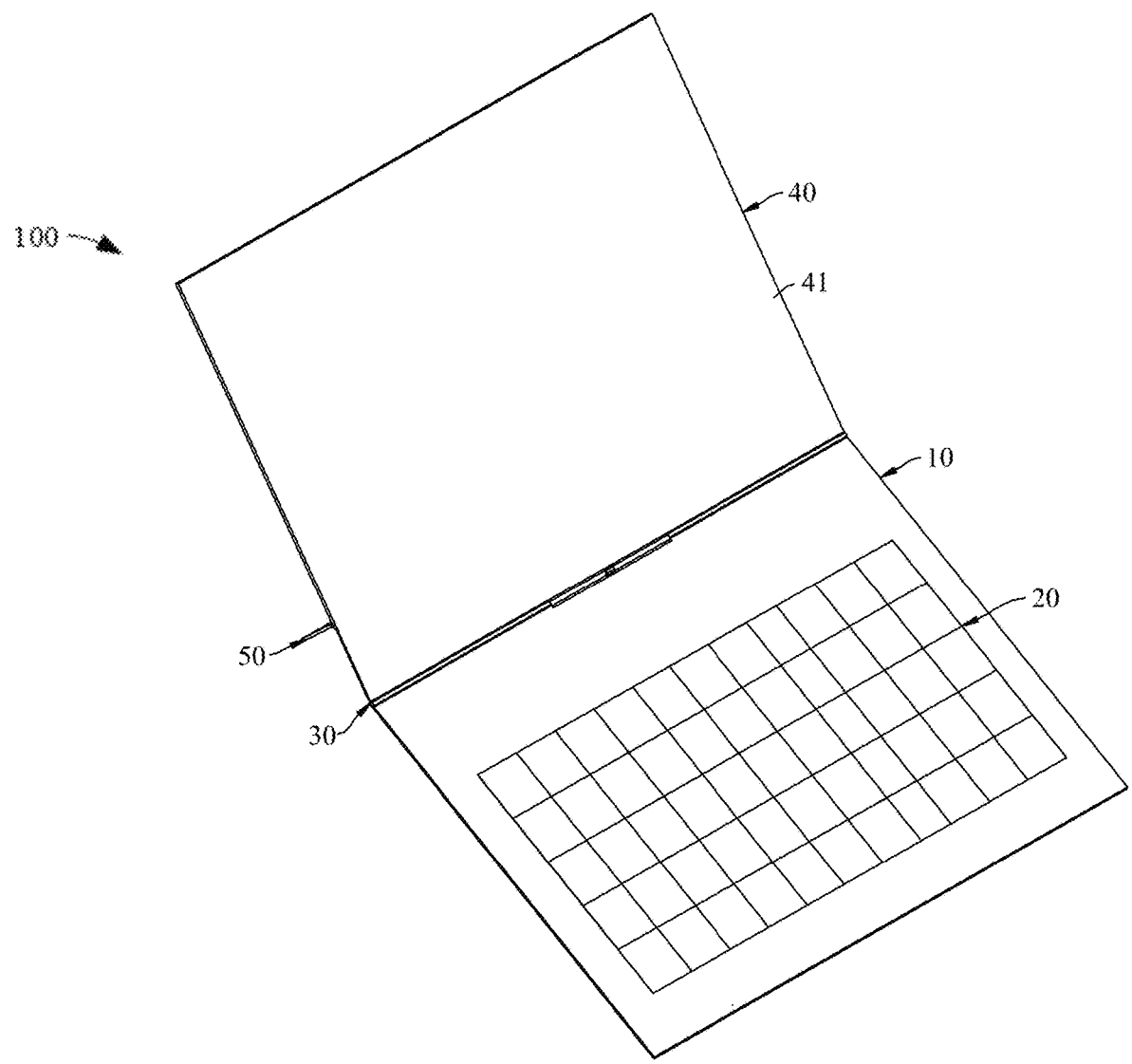
FIG. 4 is a schematic structural diagram of yet another angle of an unfolded state of a foldable support according to an embodiment of this application.
Figure 5:
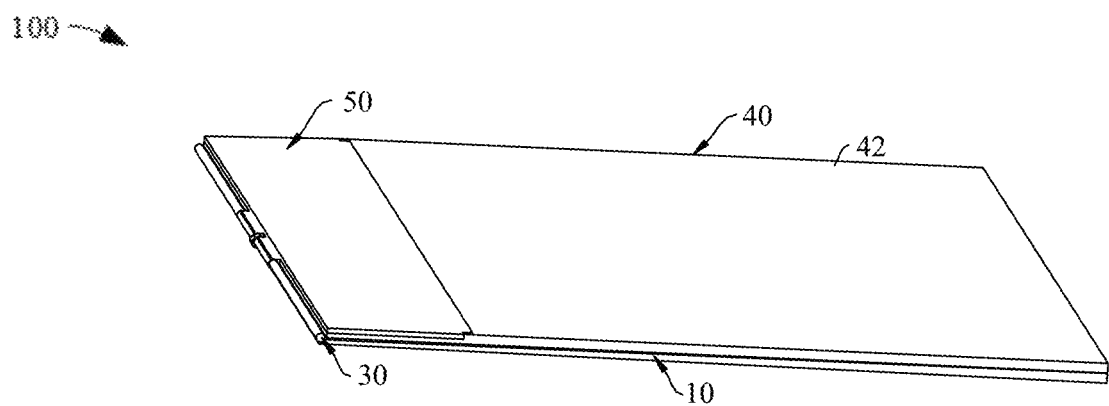
FIG. 5 is a schematic structural diagram of a closed state of a foldable support according to an embodiment of this application.
Figure 6:
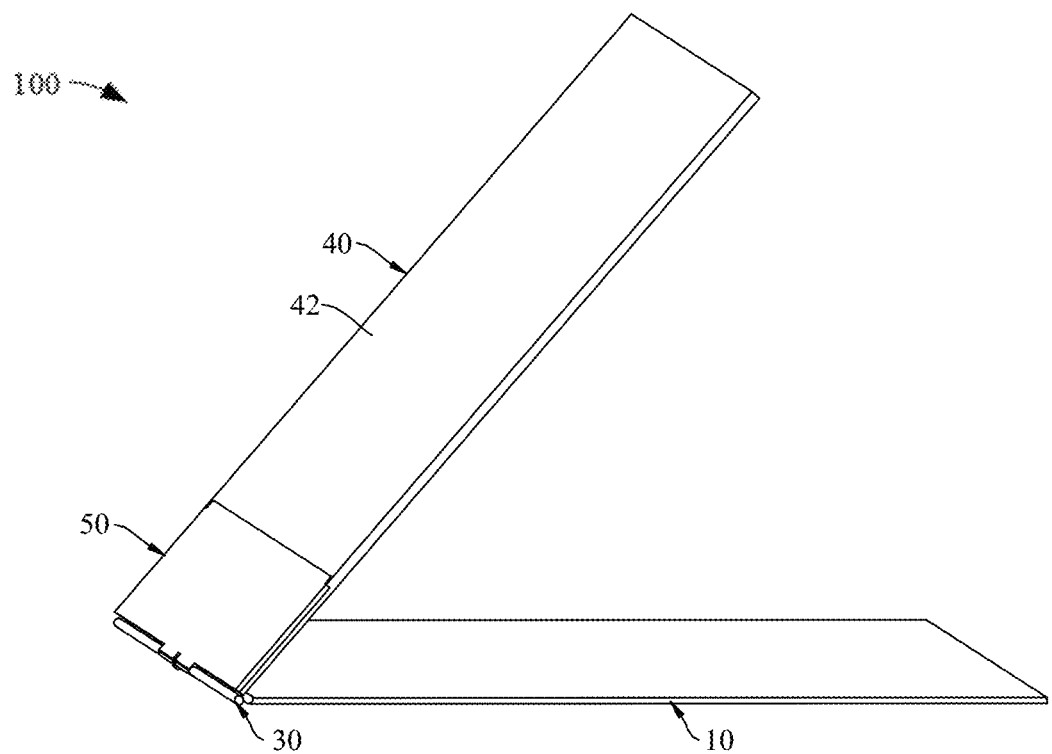
FIG. 6 is a schematic structural diagram of an intermediate state of a foldable support according to an embodiment of this application.
Figure 7:
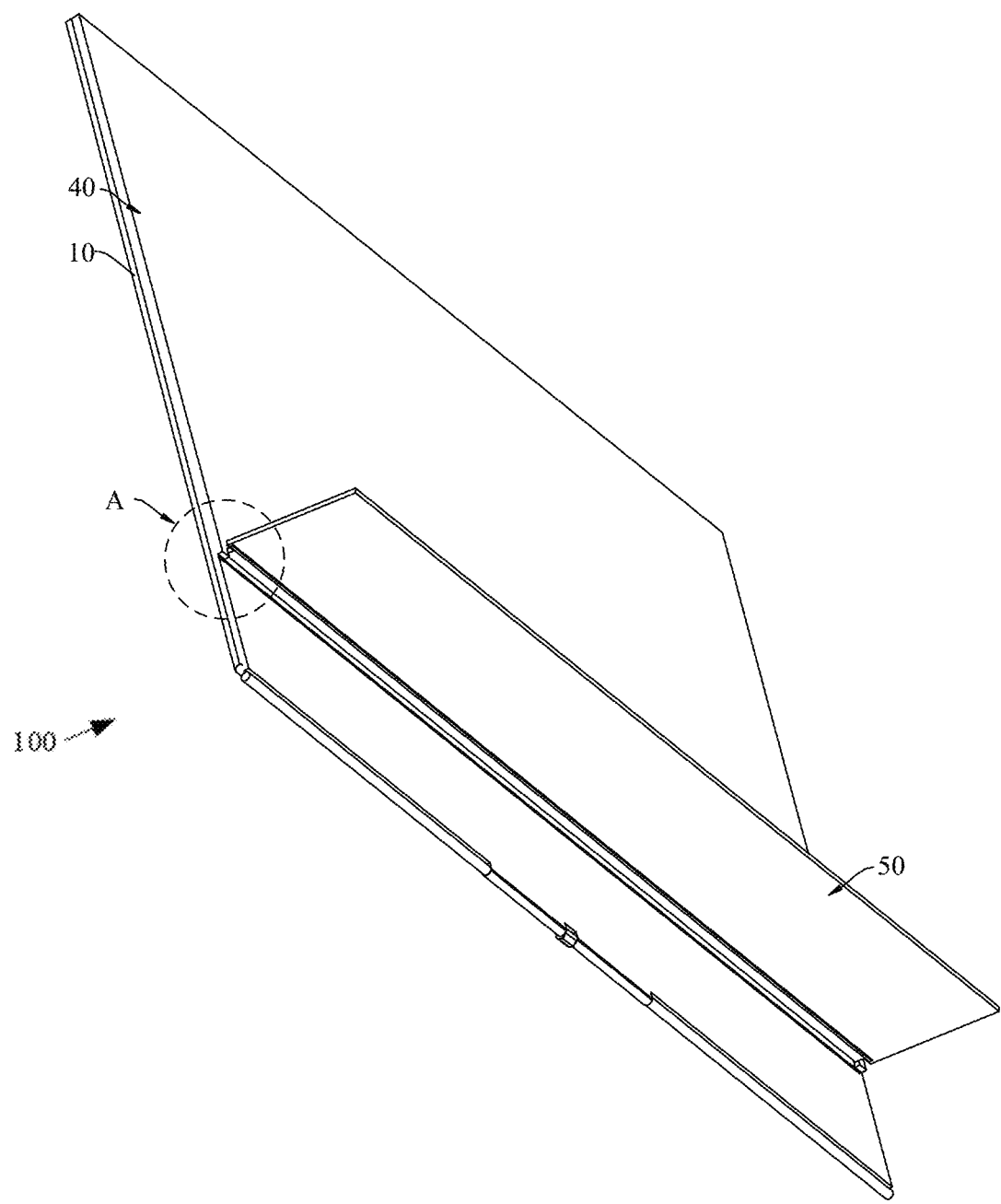
FIG. 7 is a schematic structural diagram of a foldable support according to an embodiment of this application.
Figure 8:
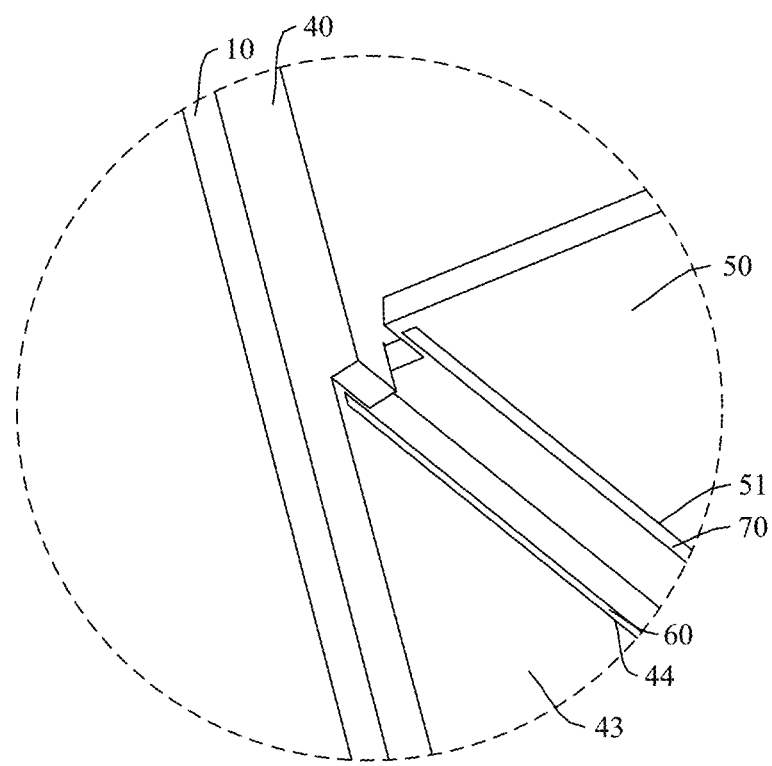
FIG. 8 is a schematic enlarged view of a region A of the foldable support shown in FIG. 7.

Referring to FIG. 2. FIG. 3. FIG. 4. FIG. 5. FIG. 6. FIG. 7, and FIG. 8, the foldable support 100 includes a bottom plate 10, a keyboard 20, a rotary mechanism 30, a first support plate 40, a second support plate 50, a first magnetic member 60, and a second magnetic member 70.

It should be noted that, a purpose of FIG. 2 to FIG. 8 is only for exemplarily describing connection relationships of the bottom plate 10, the keyboard 20, the rotary mechanism 30, the first support plate 40, the second support plate 50, the first magnetic member 60, and the second magnetic member 70, and is not intended to specifically limit a connecting position, a specific structure, and a quantity of each device. The structure shown in the embodiments of this application does not constitute a specific limitation on the foldable support 100. In some other embodiments of this application, the foldable support 100 may include more or fewer components than those shown in the figure, or some components may be combined, or some components may be split, or components are arranged in different manners. The components shown in the figure may be implemented by hardware, software, or a combination of software and hardware.

Referring to FIG. 3 and FIG. 4, the bottom plate 10 may be an independent carrier structure that can carry the keyboard 20 and the mobile terminal 210, which may be understood as a stationary part of the foldable support 100 in a closed state, an unfolded state, and an intermediate state between the closed state and the unfolded state.

The keyboard 20 is connected to the bottom plate 10, to provide an operable space for the user through a larger plate surface interval of the bottom plate 10 to a maximum extent, thereby having a high space utilization rate. Exemplarily, the keyboard 20 and the bottom plate 10 may be connected to form an integral structure. The keyboard 20 and the bottom plate 10 may be an integral structure formed in an assembly manner such as welding or bonding, or the keyboard 20 and the bottom plate 10 may also be an integral structure formed by a one-piece molding process. In addition, the keyboard 20 may be connected to the mobile terminal 210 in a wireless manner (such as Bluetooth or a wireless local area network), thereby realizing signal transmission therebetween. Alternatively, the keyboard 20 may also be connected to the mobile terminal 210 in a wired manner, thereby realizing signal transmission therebetween.

The rotary mechanism 30 is connected between the bottom plate 10 and the first support plate 40, and the rotary mechanism 30 may enable the first support plate 40 to rotate relative to the bottom plate 10 to a closed state shown in FIG. 5 in which the first support plate 40 is fitted with the bottom plate 10, or enable the first support plate 40 to rotate relative to the bottom plate 10 to an unfolded state shown in FIG. 3 in which the first support plate 40 and the bottom plate 10 are arranged at an included angle, or enable the first support plate 40 to rotate relative to the bottom plate 10 to an intermediate state between the closed state and the unfolded state shown in FIG. 6, thereby realizing the folding performance of the foldable support 100.

The first support plate 40 is connected to the bottom plate 10 through the rotary mechanism 30, and the first support plate 40 can rotate relative to the bottom plate 10, so as to enable the first support plate 40 and the bottom plate 10 to be arranged at an included angle, where the included angle may be in an angle range of 0° to 180° (including endpoint values 0° and 180°). Specifically, as shown in FIG. 5, the first support plate 40 can rotate relative to the bottom plate 10 to the closed state in which the first support plate 40 is fitted with the bottom plate 10, to enable the foldable support 100 to be in the closed state. When the foldable support 100 is in the closed state, a plane size of the foldable support 100 is relatively small, which is convenient for the user to store and carry. Exemplarily, when the foldable support 100 is in the closed state, the first support plate 40 and the bottom plate 10 can be completely folded to be parallel to each other (where a slight deviation is also allowed).

As shown in FIG. 6, the first support plate 40 can also rotate relative to the bottom plate 10 to be close to each other (folded) or away from each other (unfolded) to the intermediate state, to enable the foldable support 100 to be in the intermediate state, where the intermediate state may be any state between the unfolded state and the closed state. Exemplarily, when the foldable support 100 is in the intermediate state, the included angle between the first support plate 40 and the bottom plate 10 may be 30°, 45°, 60°, or the like.

As shown in FIG. 1 and FIG. 3, the first support plate 40) can also rotate relative to the bottom plate 10 to the unfolded state, to enable the foldable support 100 to be in the unfolded state, where the unfolded state may be understood as a support state that can provide good support performance for the mobile terminal 210. When the foldable support 100 is in the unfolded state, the foldable support 100 can be configured to carry and support the mobile terminal 210. Therefore, the foldable support 100 has an excellent support effect, and has better stability. The mobile terminal 210 may be placed on the first support plate 40, so that the first support plate 40 provides good retention stability for the mobile terminal. Exemplarily, when the foldable support 100 is in the unfolded state, the included angle between the first support plate 40 and the bottom plate 10 may be 125°, 130°, 135°, or the like.

Based on the above description, it should be understood that the foldable support 100 can be switched between the unfolded state and the closed state, and maintained in the unfolded state and the closed state.

Referring to FIG. 3 and FIG. 5, the first support plate 40 includes a carrying surface 41 and a support surface 42 that face away from each other. The carrying surface 41 may be understood as a surface of the first support plate 40 that has a larger contact area with the mobile terminal 210) when the foldable support 100 is in the unfolded state, or may be understood as a surface of the first support plate 40 that has a larger contact area with the bottom plate 10 when the foldable support 100 is in the closed state. The support surface 42 may be understood as a surface of the first support plate 40 that is directly supported by the second support plate 50 when the foldable support 100 is in the unfolded state, or may be understood as a surface of the first support plate 40 that can accommodate at least a part of the second support plate when the foldable support 100 is in the closed state.

Specifically: an accommodation groove 43 is concavely provided on the support surface 42 of the first support plate 40, the accommodation groove 43 is arranged close to the bottom plate 10, and the accommodation groove 43 can be used for accommodating a part or all of the second support plate 50. When the accommodation groove 43 is used for receiving a part of the second support plate 50, the second support plate 50 may protrude relative to a support surface 42 of the first support plate 40. When the accommodation groove 43 is used for receiving all of the second support plate 50, a shape of the accommodation groove 43 matches a shape of the second support plate 50, and a surface of the second support plate 50 exposed to the outside may be flush with the support surface 42 of the first support plate 40.

In this arrangement, as shown in FIG. 5, when the foldable support 100 is in the closed state, at least a part or all of the second support plate 50 is located in the accommodation groove 43 of the first support plate 40, so that the second support plate 50 can present layout arrangement of being inserted into the first support plate 40, so that the storage of the second support plate 50 can be realized on a basis of not occupying much space, the appearance performance is good, and the miniaturization of the foldable support 100 can be realized more easily. When the foldable support 100 is in the unfolded state, as shown in FIG. 3, the second support plate 50 can be arranged with the first support plate 40 at an included angle, and abut between an external structural member and the first support plate 40, to form a support form of a rear support to match the external structural member to support the first support plate 40. The external structural member may be understood as a structural member that can place the foldable support 100, such as a book desk, an office desk, a bedside table, or a bed computer desk. When the foldable support 100 is placed on the external structural member and is in the unfolded state, the first support plate 40, the second support plate 50, and the external structural member can jointly form a triangular structure, which is conducive to improving the support stability of the foldable support 100.

Referring to FIG. 3 and FIG. 5, the second support plate 50 may be connected to the first support plate 40 through a second rotary shaft, the second support plate 50 can rotate relative to the first support plate 40, and the second support plate 50 may be configured to match the external structural member to support the first support plate 40. That is, the second support plate 50 may rotate to a state of being fitted with the first support plate 40, and may also rotate to a state of being arranged with the first support plate 40 at an included angle to match the external structural member to jointly support the first support plate 40.

In a possible implementation, a limit block may be arranged on the second rotary shaft, to limit a rotation angle of the second support plate 50 relative to the first support plate 40, thereby ensuring the support performance of the foldable support 100.

It should be noted that, a size of the second support plate 50 may be set as small as possible on a basis of the good support performance. In addition, an angle range of the included angle between the second support plate 50 and the first support plate 40 is not strictly limited in the embodiments of this application, and an angle range of the triangular structure formed by the second support plate 50, the first support plate 40, and the external structural member in the unfolded state of the foldable support 100 can all fall into the protection scope of the embodiments of this application.

By arranging the second support plate 50 and enabling the second support plate 50 to match the external structural member to support the first support plate 40, when the foldable support 100 is in the unfolded state, the first support plate 40 can open relative to the bottom plate 10 to carry a device such as the mobile terminal 210, and the second support plate 50 can also open relative to the first support plate 40 and support between the external structural member and the first support plate 40, so that the second support plate 50, the first support plate 40, and the external structural member can jointly form a triangular structure. Because of better stability and a good capability of resisting interference of external environmental factors, the triangular structure is easier to support the device such as the mobile terminal 210, and can effectively prevent the device from slipping off the foldable support 100, so that the foldable support 100 can realize better support performance and retention stability.

In addition, by arranging that the second support plate 50 matches the external structural member to support the first support plate 40, the second support plate 50 can be structurally in a rear support form located behind the first support plate 40. On the one hand, the support performance of the second support plate 50 can be realized without occupying a plate surface space of the bottom plate 10, and a problem in which, in the prior art, because a center of gravity of the unfolded state of the foldable support 100 is controlled in an interval where the bottom plate 10 is located, a spatial layout of devices on the bottom plate 10 is compressed to affect an overall support effect and stability of the foldable support 100 can be effectively avoided. On the other hand, a space jointly defined by the first support plate 40 and the bottom plate 10 can be released, and a layout space of the bottom plate 10 can be transferred to a maximum extent, so that more or larger-area devices can be laid on the defined plate surface space of the bottom plate 10, and a purpose of increasing the operable space that is operated by the user can be realized, which is conducive to improving the space utilization rate of the foldable support 100.

Based on the above description, it should be understood that, when the foldable support 100 is in the closed state, the first support plate 40 is fitted with the bottom plate 10, and the second support plate 50 is fitted with the first support plate 40, so that the foldable support 100 is in a folded state as a whole; and when the foldable support 100 is in the unfolded state, the first support plate 40 and the bottom plate 10 are arranged at an included angle, and the second support plate 50 and the first support plate are also arranged at an included angle, so that the foldable support 100 is in a stretched state as a whole.

Referring to FIG. 7 and FIG. 8, the first magnetic member 60 is arranged on the first support plate 40. Specifically, a first groove 44 may be provided on the support surface 42 of the first support plate 40, the first groove 44 may be located on a bottom wall of the accommodation groove 43, and the first magnetic member 60 is received in the first groove 44. That is, the first groove 44 is concavely provided on the bottom wall of the accommodation groove 43, so that the receiving of the accommodation groove 43 for the second support plate 50 is not affected while the first groove 44 receives the first magnetic member 60, thereby having good reliability.

It should be noted that the first magnetic member 60 may be in any shape that can realize work performance, such as a strip shape, or a column shape. The shape of the first magnetic member 60 is not strictly limited in the embodiments of this application.

The first magnetic member 60 may be an electromagnet, which can generate a magnetic field after power-on. The first magnetic member 60 may be electrically connected to a first circuit (not shown in the figures) when the included angle between the first support plate 40 and the bottom plate 10 is less than a preset angle, so as to generate magnetism that attracts that of the second magnetic member 70 when power-on, thereby enabling the first support plate 40 and the second support plate 50 to be close to each other to be folded. The first magnetic member 60 may also be electrically connected to a second circuit (not shown in the figures) when the included angle between the first support plate 40 and the bottom plate 10 is greater than or equal to the preset angle, so as to generate magnetism that repels that of the second magnetic member 70 when power-on, thereby enabling the first support plate 40 and the second support plate 50 to be away from each other to be unfolded. The preset angle may be 90°, 120°, or the like. The first circuit may be understood as a circuit that can realize attraction between the magnetism of the first magnetic member 60 and the magnetism of the second magnetic member 70. The second circuit may be understood as a circuit that can realize repulsion between the magnetism of the first magnetic member 60 and the magnetism of the second magnetic member 70.

That is, the first magnetic member 60 is configured to attract the second magnetic member 70 when the included angle between the first support plate 40 and the bottom plate 10 is less than the preset angle, to enable the second support plate 50 to be fitted with the first support plate 40. The first magnetic member 60 is further configured to repel the second magnetic member 70 when the included angle between the first support plate 40 and the bottom plate 10 is greater than or equal to the preset angle, to enable the second support plate 50 and the first support plate 40 to be arranged at an included angle.

In other words, when the included angle between the first support plate 40 and the bottom plate 10 is less than the preset angle, the second support plate 50 is fitted with the first support plate 40, and only the first support plate 40 and the bottom plate 10 are arranged at an included angle. In this case, the foldable support 100 may be in the closed state, and may also be in the intermediate state between the closed state and the unfolded state. When the included angle between the first support plate 40 and the bottom plate 10 is greater than or equal to the preset angle, the second support plate 50 is separated from the first support plate 40, and the first support plate 40 and the bottom plate 10, and the first support plate 40 and the second support plate 50 each are arranged at an included angle. In this case, the foldable support 100 may be in the unfolded state, and may also be in the intermediate state between the closed state and the unfolded state.

In a specific application scenario, the first magnetic member 60 includes a first magnetic pole and a second magnetic pole, the first magnetic pole is a magnetic pole facing the second magnetic member 70) in the first magnetic member 60, and the second magnetic pole is a magnetic pole away from the second magnetic member 70 in the first magnetic member 60. The second magnetic member 70 includes a third magnetic pole and a fourth magnetic pole, the third magnetic pole is a magnetic pole facing the first magnetic member 60 in the second magnetic member 70, and the fourth magnetic pole is a magnetic pole away from the first magnetic member 60 in the second magnetic member 70. The third magnetic pole is an S-pole, and the fourth magnetic pole is an N-pole. When the included angle between the first support plate 40 and the bottom plate 10 is less than the preset angle, the first magnetic pole is the S-pole, and the second magnetic pole is the N-pole, so that the first magnetic member 60 and the second magnetic member 70 attract each other because of attraction of opposite poles, thereby enabling the first support plate 40 and the second support plate 50 to be close to each other to be folded. When the included angle between the first support plate 40 and the bottom plate 10 is greater than or equal to the preset angle, polarities of the first magnetic pole and the second magnetic pole are opposite to each other so that the first magnetic pole is the N-pole and the second magnetic pole is the S-pole, so that the first magnetic member 60 and the second magnetic member 70 repel each other because of repulsion of like poles, thereby enabling the first support plate 40 and the second support plate 50 to be away from each other to be unfolded.

Referring to FIG. 7 and FIG. 8, the second magnetic member 70 is arranged on the second support plate 50. Specifically, a second groove 51 may be provided on a surface of the second support plate 50 opposite to the accommodation groove 43, and the second magnetic member 70 is received in the second groove 51, so that the second support plate 50 has work performance of receiving the second magnetic member 70 while the second support plate 50 being received in the accommodation groove 43 is not affected, thereby having better aesthetics. The second magnetic member 70 may be a magnet. It should be noted that the second magnetic member 70 may be in any shape that can realize work performance, such as a strip shape, or a column shape. The shape of the second magnetic member 70) is not strictly limited in the embodiments of this application.

Positions of the second magnetic member 70 and the first magnetic member 60 are arranged correspondingly, so that a good interaction force can exist between the first magnetic member 60 and the second magnetic member 70. The interaction force may include an attraction force when the first magnetic member 60) and the second magnetic member 70) attract each other, and may also include a repulsion force when the first magnetic member 60 and the second magnetic member 70 repel each other. Exemplarily, the first magnetic member 60 may be located on a position close to the second rotary shaft, that is, the second magnetic member 70 may be located on a position close to the second rotary shaft. In this arrangement, the magnetic member and the rotary mechanism 30 can be independent from each other due to a specific distance therebetween, so as to effectively avoid a problem of interference due to an excessively short distance therebetween, thereby having good reliability.

Based on the above description, it should be understood that the magnetism of the first magnetic member 60 may change. A structure of the rotary mechanism 30 is described below with reference to FIG. 3, and FIG. 9 to FIG. 14, to explain a principle that the magnetism of the first magnetic member 60 changes.

Figure 9:
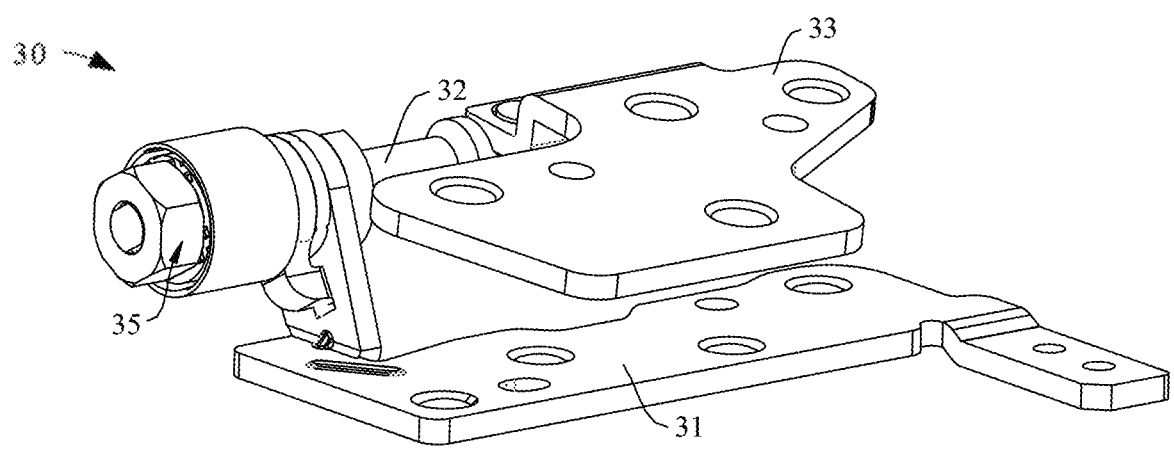
FIG. 9 is a schematic structural diagram of a rotary mechanism of a foldable support according to an embodiment of this application.
Figure 10:
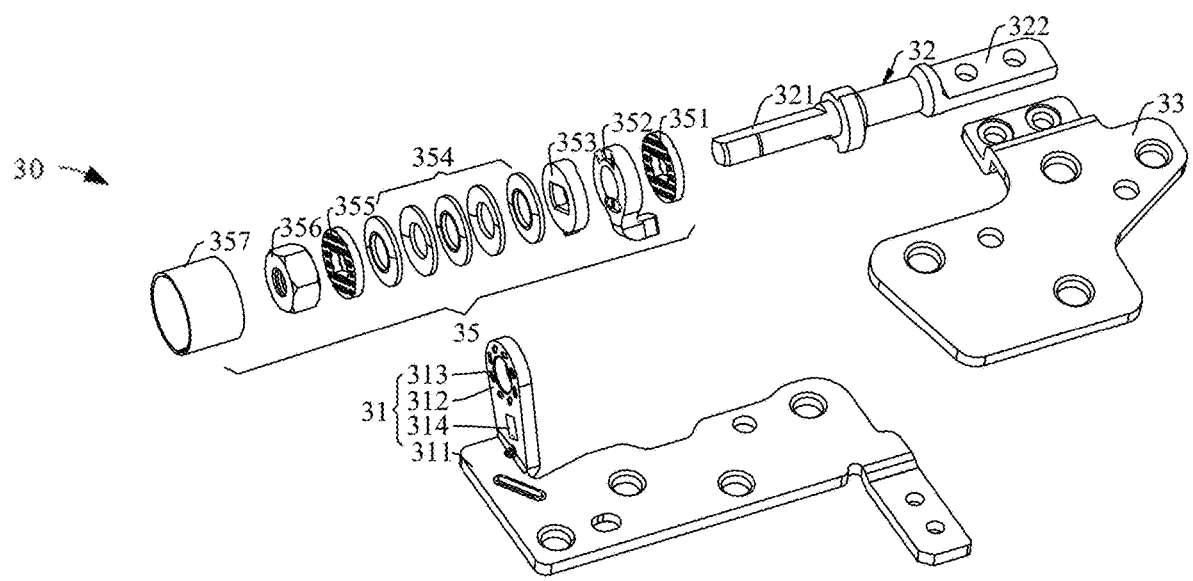
FIG. 10 is a schematic exploded view of a rotary mechanism of a foldable support according to an embodiment of application this application.

Referring to FIG. 3. FIG. 9, and FIG. 10, the rotary mechanism 30 includes a first support 31, a first rotary shaft 32, a second support 33, a conductive structure 34, and a damping structure 35. The damping structure 35 includes a second friction member 351, a concave gear 352, a cam 353, a first elastic member 354, a first friction member 355, a fastener 356, and a shaft sleeve 357 that are successively sleeved to the first rotary shaft 32.

The first support 31 is connected to the bottom plate 10, so as to be always stationary in the closed state, the unfolded state, and the intermediate state between the closed state and the unfolded state of the foldable support 100. It should be noted that, a key design of this application does not lie in an implementation form of the connection between the first support 31 and the bottom plate 10, and a specific structure and a position of the connection between the first support 31 and the bottom plate 10 are not strictly limited.

The first support 31 includes a fixing plate 311 and a boss 312, and the boss 312 is protruded on the fixing plate 311. An end of the boss 312 away from the fixing plate 311 is provided with a first through hole 313 through which the first rotary shaft 32 can pass, and the first through hole 313 may be a circular hole. An end of the boss 312 close to the fixing plate 311 is provided with a clamping slot 314 on which the concave gear 352 can be clamped. A shape of the clamping slot 314 may match that of a structure that is to-be-clamped on the concave gear 352, so as to ensure the stability and reliability of the connection between the concave gear 352 and the first support 31.

The first rotary shaft 32 can perform a rotation movement together with the second support 33, and the first rotary shaft 32 can rotate relative to the first support 31. The first rotary shaft 32 includes a first end 321 and a second end 322, the first end 321 is an end of the first rotary shaft 32 connected to the first support 31, and the second end 322 is an end of the first rotary shaft 32 connected to the second support 33. The first end 321 of the first rotary shaft 32 passes through the first through hole 313 of the boss 312, and the first end 321 of the first rotary shaft 32 protrudes and extends relative to the boss 312, so as to realize that a connection relationship between another structural member of the rotary mechanism 30 and the first end 321 of the first rotary shaft 32 is not affected on a basis of a connection relationship between the first rotary shaft 32 and the first support 31. In this embodiment of this application, the first end 321 of the first rotary shaft 32 may be in a shape of a flat shaft, where a cross-sectional shape of the flat shaft is an ellipse-like shape.

The second end 322 of the first rotary shaft 32 may be detachably connected to the second support 33. The detachable connection manner can facilitate that the second support 33 and the first rotary shaft 32 are assembled together when needing to be connected, and can separate them from each other when the second support 33 and/or the first rotary shaft 32 need to be repaired or replaced. In this way: disassembly and assembly are quick and convenient, and maintenance is convenient, which is conducive to improving the maintenance efficiency. Exemplarily: the detachable connection manner between the second end 322 of the first rotary shaft 32 and the second support 33 may be, but is not limited to, screw connection, snap connection, and the like. Certainly, the second end 322 of the first rotary shaft 32 may also be welded to the second support 33, which is not strictly limited. The second support 33 is connected to the first support plate 40, to synchronously move under driving of the first support plate 40. The second support 33 is fixedly connected to the first rotary shaft 32. That is, the second support 33 and the first rotary shaft 32 can realize linkage. When the second support 33 performs a rotation movement, the first rotary shaft 32 is driven to synchronously perform the rotation movement. It should be noted that, a key design of this application does not lie in an implementation form of the connection between the second support 33 and the first support plate 40, and a specific structure and a position of the connection between the second support 33 and the first support plate 40 are not strictly limited.

The second friction member 351 is annular and is sleeved to the first end 321 of the first rotary shaft 32. Opposite surfaces of the second friction member 351 abut against the boss 312 and the cam 353 of the first support 31 respectively. The second friction member 351 can provide friction and damping for a rotating process of the foldable support 100, which is conducive to improving the rotation reliability of the foldable support 100.

Figure 11:
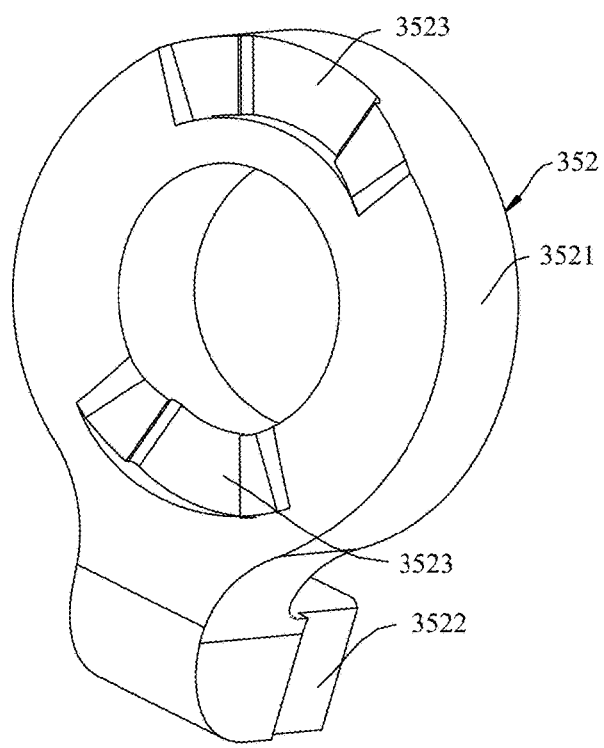
FIG. 11 is a schematic structural diagram of a concave gear of a rotary mechanism of a foldable support according to an embodiment of this application.

Referring to FIG. 9. FIG. 10, and FIG. 11, the concave gear 352 includes a body 3521 and a clamping body 3522. The body 3521 is annular and is sleeved to the first end 321 of the first rotary shaft 32, and a surface of the body 3521 abuts against the second friction member 351, so that the second friction member 351 presents structural arrangement of being located between the concave gear 352 and the first support 31. Another surface of the body 3521 away from the second friction member 351 is in contact with the cam 353, and a groove 3523 is provided on the surface. The groove 3523 can match a corresponding structure on the cam 353 to realize a similar meshing relationship between teeth and teeth, so as to realize close fit between the first support plate 40 and the bottom plate 10 in the closed state of the foldable support 100, and effectively minimize a possibility of a problem in which the first support plate 40 and the bottom plate 10 are not tightly closed in the closed state of the foldable support 100 because the concave gear 352 is in plane contact with the cam 353. Exemplarily, a quantity of grooves 3523 may be two, and the two grooves 3523 are oppositely arranged on the surface of the body 3521 away from the second friction member 351.

An end of the clamping body 3522 is connected to the body 3521, and another end of the clamping body 3522 away from the body 3521 is connected to the clamping slot 314 of the boss 312, so as to realize clamping between the cam 353 and the first support 31. It may be understood that, in the closed state, the unfolded state, and the intermediate state between the closed state and the unfolded state of the foldable support 100, the first support 31 is always stationary, and because the cam 353 is clamped with the first support 31, the cam 353 can be limited to rotating along a circumferential direction of the first rotary shaft 32 under an acting force of the first support 31, where the circumferential direction of the first rotary shaft 32 is a direction surrounding a central axis of the first rotary shaft 32. In other words, in a rotating process of the first rotary shaft 32, because of a clamping relationship with the first support 31, the cam 353 can be limited to performing a rotation movement together with the first rotary shaft 32 (where slight rotation is also allowed).

Figure 12:
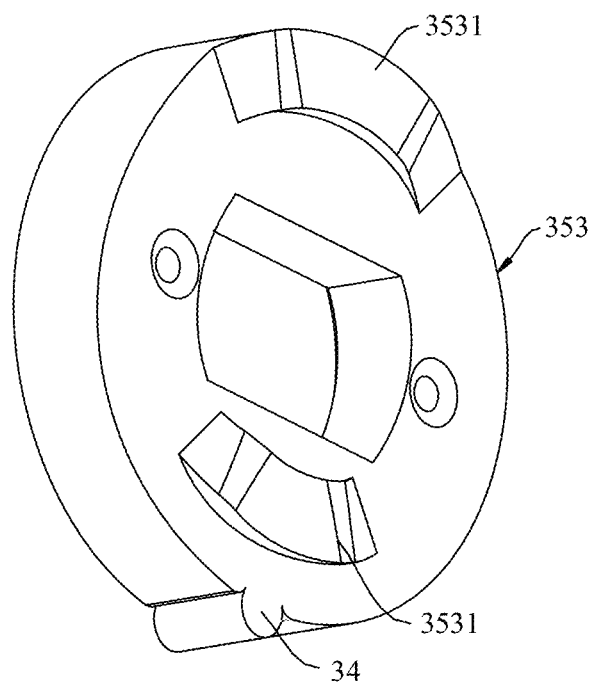
FIG. 12 is a schematic structural diagram of a cam of a rotary mechanism of a foldable support according to an embodiment of this application.
Figure 13:
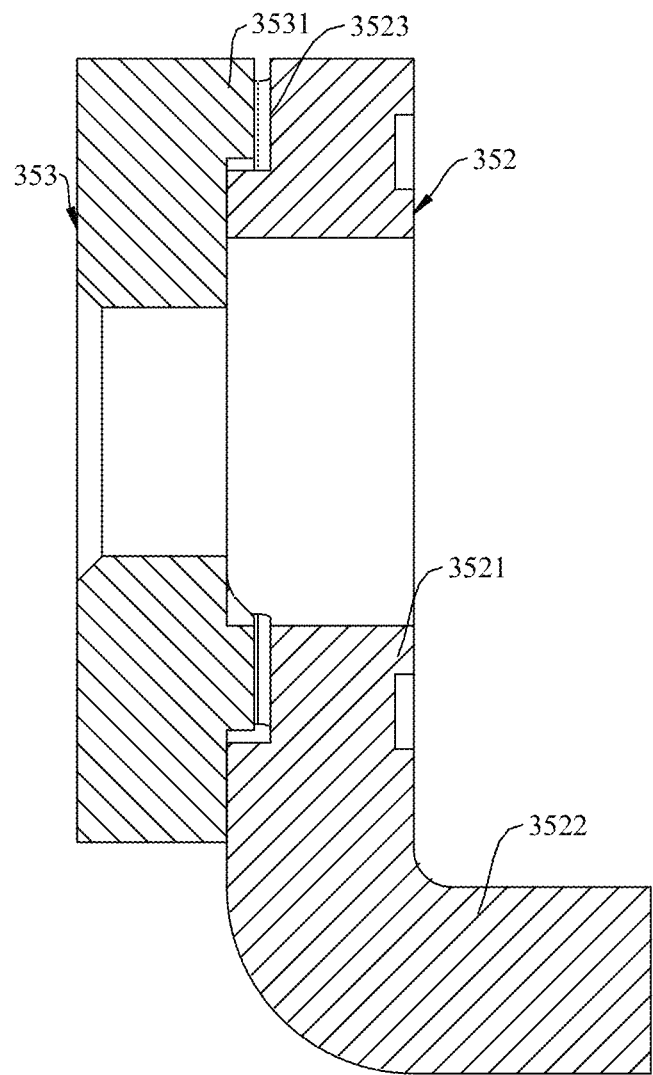
FIG. 13 is a schematic cross-sectional view of a cam matching a concave gear in a rotary mechanism of a foldable support according to an embodiment of application this application.

Referring to FIG. 9. FIG. 10. FIG. 12, and FIG. 13, the cam 353 is annular and is sleeved to the first end 321 of the first rotary shaft 32, a surface of the cam 353 is in contact with the concave gear 352, and another surface of the cam 353 is in contact with the first elastic member 354. A hole in the center of the cam 353 matches a shape of the first end 321 of the first rotary shaft 32 to present an ellipse-like shape. In this arrangement, the cam 353 can be driven in the rotating process of the first rotary shaft 32 to perform a rotation movement together. A protrusion 3531 is arranged on a surface of the cam 353 in contact with the concave gear 352 (where the protrusion 3531 is the corresponding structure on the cam 353). The protrusion 3531 abuts against the groove 3523 to realize the similar meshing relationship between teeth and teeth, so as to realize close fit between the first support plate 40 and the bottom plate 10 in the closed state of the foldable support 100, and effectively minimize the possibility of the problem in which the first support plate 40 and the bottom plate 10 are not tightly closed in the closed state of the foldable support 100 because the concave gear 352 is in plane contact with the cam 353. Exemplarily, a quantity of protrusions 3531 may be two, and the two protrusions 3531 are oppositely arranged on a surface of the cam 353 facing the concave gear 352.

The first elastic member 354 is sleeved to the first end 321 of the first rotary shaft 32 and elastically abuts between the cam 353 and the first friction member 355. Exemplarily, the first elastic member 354 may be a disc spring, or the first elastic member 354 may be a spring. Therefore, the cam 353 can be pushed to be in pressing contact with the concave gear 352 because of good elasticity of the first elastic member 354, to ensure a damping effect that the cam 353 and the concave gear 352 can realize. It may be understood that, because the structure limits an axial movement and circumferential rotation of the concave gear 352 so that only the cam 353 has an axial movement space, and because the cam 353 and the concave gear 352 are always in good matching and contact, the cam 353 can perform an axial movement along the first rotary shaft 32 to compress or release the first elastic member 354 under an acting force of the concave gear 352 on the cam 353, thereby improving the damping effect, and improving usage experience of the user when folded.

In the rotating process of the first rotary shaft 32, the cam 353 generates a relative movement with the concave gear 352, where the relative movement may be understood as that the cam 353 is squeezed to slide relative to the concave gear 352 along the first rotary shaft 32, so that an axial distance between the cam 353 and the concave gear 352 changes, to compress the first elastic member 354 to generate a damping force. When the damping force brought by the first elastic member 354 is greater than a gravity thereof, the foldable support 100 may stop at a plurality of angles, that is, the foldable support 100 may hover at different angles.

The first friction member 355 is annular and is sleeved to the first end 321 of the first rotary shaft 32. Opposite surfaces of the first friction member 355 abut against the first elastic member 354 and the fastener 356 respectively, that is, the first friction member 355 is located between the first elastic member 354 and the fastener 356. The first friction member 355 can provide friction and damping for a rotating process of the foldable support 100, which is conducive to improving the rotation reliability of the foldable support 100. It should be noted that, in the embodiments of this application, the first friction member 355 may not be arranged. Therefore, the first elastic member 354 may directly abut between the cam 353 and the fastener 356.

The fastener 356 is sleeved to the first end 321 of the first rotary shaft 32. The fastener 356 is fixedly connected to the first end 321 of the first rotary shaft 32, and abuts against the first elastic member 354. Exemplarily, the fastener 356 may be a fastening nut, which may be locked on the first end 321 of the first rotary shaft 32. It may be understood that, in a moving process of the cam 353 along an axial direction, because the first elastic member 354 is squeezed by the cam 353 to be in a compressed state, a larger elastic force is applied to an end of the first elastic member 354 away from the cam 353. Therefore, by arranging the fastener 356 on this end, a problem in which the first elastic member 354 falls off due to an excessive force can be resolved because of good retention stability between the fastener 356 and the first rotary shaft 32, which is conducive to ensuring that a folding movement of the foldable support 100 does not deflect, thereby having good reliability.

Referring to FIG. 9. FIG. 10, and FIG. 12, the conductive structure 34 is connected to a peripheral side surface of the cam 353, and may follow the rotation of the cam 353 to perform a rotation movement together, and the conductive structure 34 may be electrically connected to the first circuit or the second circuit, to realize corresponding functions of the first circuit and the second circuit. Exemplarily, the conductive structure 34 may be connected to the cam 353 by bonding, welding, or the like.

The shaft sleeve 357 is in a shape of a hollow sleeve, and is sleeved to peripheries of the first friction member 355, the first elastic member 354, the cam 353, the concave gear 352, and the second friction member 351. The shaft sleeve 357 can enable internal structural members thereof to be not disturbed by external environmental factors, thereby having good protection performance. A first conductive contact point and a second conductive contact point are arranged on an internal surface of the shaft sleeve 357, and both the first conductive contact point and the second conductive contact point can conduct with the conductive structure 34. There is an interval between the first conductive contact point and the second conductive contact point, that is, the first conductive contact point and the second conductive contact point are arranged on the internal surface of the shaft sleeve 357 at the interval.

It may be understood that the first conductive contact point is electrically connected to the first magnetic member 60, and the first conductive contact point is electrically connected to the first circuit. The first conductive contact point is configured to conduct with the first magnetic member 60 when the included angle between the first support plate 40 and the bottom plate 10 is less than the preset angle, to enable the magnetism of the first magnetic member 70 to attract that of the second magnetic member 60. The second conductive contact point is electrically connected to the second magnetic member 70, and the second conductive contact point is electrically connected to the second circuit. The second conductive contact point is configured to conduct with the first magnetic member 60) when the included angle between the first support plate 40 and the bottom plate 10 is the preset angle, to enable the magnetism of the first magnetic member 60 to repel that of the second magnetic member 70.

When the first conductive contact point and the second conductive contact point are not in contact with the conductive structure 34 on the cam 353, because the first conductive contact point and the second conductive contact point are breakpoints, the first circuit and the second circuit cannot conduct. When the cam 353 rotates to that the conductive structure 34 thereon is in contact with the first conductive contact point or the second conductive contact point, the first circuit or the second circuit conducts.

When the first support plate 40 rotates relative to the bottom plate 10 and the included angle between the first support plate 40 and the bottom plate 10 is less than the preset angle, the conductive structure 34 on the cam 353 is in contact with the first conductive contact point to enable the first circuit to conduct, so as to enable the magnetism generated by the first magnetic member 60 to attract the magnetism generated by the second magnetic member 70, thereby enabling the first support plate 40 to be fitted with the second support plate 50. When the first support plate 40 rotates relative to the bottom plate 10 and the included angle between the first support plate 40 and the bottom plate 10 is greater than or equal to the preset angle, the conductive structure 34 on the cam 353 is separated from the first conductive contact point and is in contact with the second conductive contact point to enable the second circuit to conduct, so as to enable the magnetism generated by the first magnetic member 60 to repel the magnetism generated by the second magnetic member 70, thereby enabling the second support plate 50 to open relative to the first support plate 40, enabling the second support plate 50, the first support plate 40, and the external structural member to form a stable support angle, and enabling the foldable support 100 to realize an opened state. When the first support plate 40 rotates again relative to the bottom plate 10 and the included angle between the first support plate 40) and the bottom plate 10 is less than or equal to the preset angle, the conductive structure 34 on the cam 353 is separated from the second conductive contact point and is in contact with the first conductive contact point to enable the first circuit to conduct, so as to enable the magnetism generated by the first magnetic member 60 to attract the magnetism generated by the second magnetic member 70, thereby enabling the first support plate 40 to be fitted with the second support plate 50, and enabling the foldable support 100 to realize the closed state.

Figure 14:
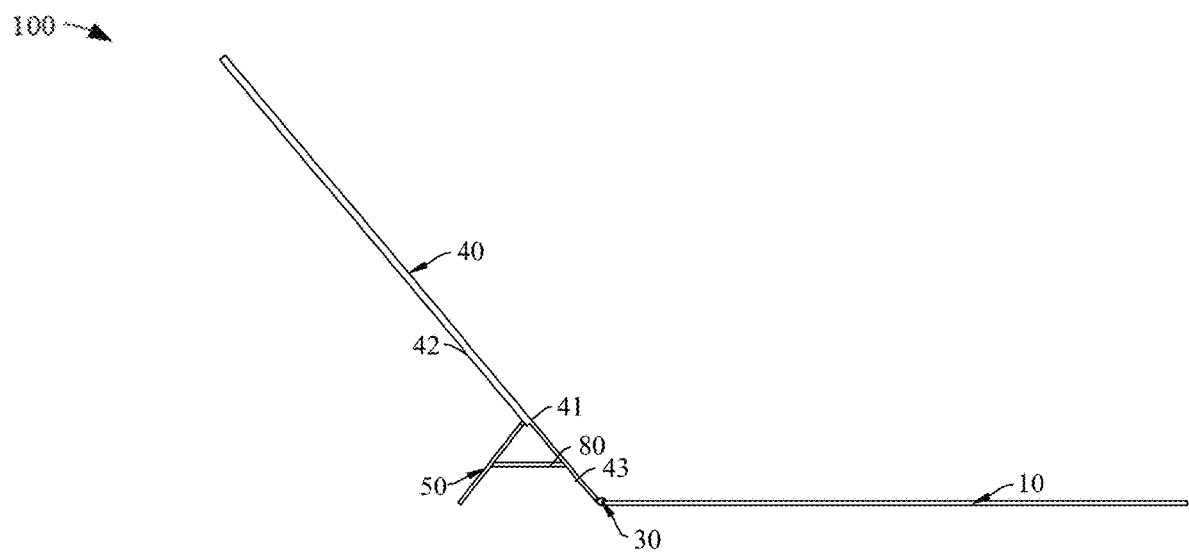
FIG. 14 is another schematic structural diagram of a foldable support according to an embodiment of this application.

In a possible implementation, as shown in FIG. 14, the foldable support 100 may further include a second elastic member 80, and the second elastic member 80 is elastically connected between the first support plate 40 and the second support plate 50. Exemplarily, the second elastic member 80 may be an elastic cloth.

It may be understood that, because the second elastic member 80 is arranged between the first support plate 40 and the second support plate 50, when the first support plate 40 rotates relative to the bottom plate 10 until the included angle between the first support plate 40 and the bottom plate 10 is the preset angle, the first support plate 40 can continue to rotate relative to the bottom plate 10 because of an elastic force of the second elastic member 80, so that the included angle between the first support plate 40 and the bottom plate 10 further increases, so as to adapt to a change of a viewing angle of the user when the mobile terminal 210 is placed on the foldable support 100. In this implementation, when the first support plate 40 rotates again relative to the bottom plate 10 and the included angle between the first support plate 40 and the bottom plate 10 is less than or equal to the preset angle, the second elastic member 80 has no elastic force, and the foldable support 100 gradually realizes the closed state.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention Therefore, the protection scope of the present invention shall be subject to the protection scope of the claims.

What is claimed is:

1. A foldable support, comprising:
   a bottom plate;
   a first support plate and a second support plate, wherein the first support plate is connected to the bottom plate, the first support plate is capable of rotating relative to the bottom plate, the second support plate is connected to the first support plate, the second support plate is capable of rotating relative to the first support plate, and the second support plate is configured to match an external structural member to support the first support plate; and
   a first magnetic member and a second magnetic member, wherein at least one of the first magnetic member or the second magnetic member comprises an electromagnet, the first magnetic member is arranged on the first support plate, the second magnetic member is arranged on the second support plate, and the first magnetic member is configured to attract the second magnetic member in a case that an included angle between the first support plate and the bottom plate is less than a preset angle, to enable the second support plate to be fitted with the first support plate; and the first magnetic member is further configured to repel the second magnetic member in a case that the included angle between the first support plate and the bottom plate is greater than or equal to the preset angle, to enable the second support plate and the first support plate to be arranged at an included angle.

2. The foldable support according to claim 1, wherein the foldable support further comprises a rotary mechanism, the first support plate is rotatably connected to the bottom plate through the rotary mechanism, and the rotary mechanism has a first conductive contact point; and
   the first conductive contact point is configured to conduct with the first magnetic member in a case that the included angle between the first support plate and the bottom plate is less than the preset angle, to enable magnetism of the first magnetic member to attract that of the second magnetic member.

3. The foldable support according to claim 1, wherein the foldable support further comprises a rotary mechanism, the first support plate is rotatably connected to the bottom plate through the rotary mechanism, and the rotary mechanism has a second conductive contact point; and
   the second conductive contact point is configured to conduct with the first magnetic member in a case that the included angle between the first support plate and the bottom plate is the preset angle, to enable magnetism of the first magnetic member to repel that of the second magnetic member.

4. The foldable support according to claim 2, wherein the rotary mechanism comprises a first support, a second support, and a first rotary shaft, the first support is connected to the bottom plate, the second support is connected to the first support plate, a first end of the first rotary shaft is connected to the first support, a second end of the first rotary shaft is connected to the second support, and the second support is capable of rotating relative to the first support.

5. The foldable support according to claim 4, wherein the rotary mechanism further comprises a cam, a shaft sleeve, and a conductive structure, the cam is sleeved to the first end of the first rotary shaft, the cam is capable of being driven by the first rotary shaft to rotate, the shaft sleeve is sleeved to a periphery of the cam, the first conductive contact point and the second conductive contact point are arranged on an inner surface of the shaft sleeve, the conductive structure is connected to a peripheral side surface of the cam, and the conductive structure is configured to conduct with the first conductive contact point or the second conductive contact point.

6. The foldable support according to claim 5, wherein the rotary mechanism further comprises a concave gear, the concave gear comprises a body and a clamping body connected to the body, the body is sleeved to the first end of the first rotary shaft, and the body is in contact with the cam, and an end of the clamping body away from the body is clamped with the first support.

7. The foldable support according to claim 6, wherein a protrusion is arranged on the cam, a groove is provided on the body of the concave gear, and the protrusion abuts against the groove.

8. The foldable support according to claim 5, wherein the rotary mechanism further comprises a first elastic member and a fastener, the fastener is fixedly connected to the first end of the first rotary shaft, and the first elastic member is sleeved to the first end of the first rotary shaft, and elastically abuts between the fastener and the cam.

9. The foldable support according to claim 5, wherein the rotary mechanism further comprises a fastener sleeved to the first end of the first rotary shaft, a first friction member, and a first elastic member, the fastener is fixedly connected to the first end of the first rotary shaft, the first friction member is located between the fastener and the first elastic member, and the first elastic member elastically abuts between the first friction member and the cam.

10. The foldable support according to claim 6, wherein the rotary mechanism further comprises a second friction member, and the second friction member is sleeved to the first end of the first rotary shaft, and is located between the concave gear and the first support.

11. The foldable support according to claim 1, wherein the first support plate comprises a carrying surface and a support surface that face away from each other, the carrying surface is used for carrying a mobile terminal, an accommodation groove is provided on the support surface, and the accommodation groove is used for accommodating at least one part of the second support plate.

12. The foldable support according to claim 1, wherein the foldable support comprises a keyboard, and the keyboard is connected to the bottom plate.

13. The foldable support according to claim 1, wherein the foldable support further comprises a second elastic member, and the second elastic member is elastically connected between the first support plate and the second support plate.

14. An electronic device, comprising:
a mobile terminal; and
a foldable support coupled to the mobile terminal, the foldable support comprising:
   a bottom plate,
   a first support plate and a second support plate, wherein the first support plate is connected to the bottom plate, the first support plate is capable of rotating relative to the bottom plate, the second support plate is connected to the first support plate, the second support plate is capable of rotating relative to the first support plate, and the second support plate is configured to match an external structural member to support the first support plate, and
   a first magnetic member and a second magnetic member, wherein at least one of the first magnetic member or the second magnetic member comprises an electromagnet, the first magnetic member is arranged on the first support plate, the second magnetic member is arranged on the second support plate, and the first magnetic member is configured to attract the second magnetic member in a case that an included angle between the first support plate and the bottom plate is less than a preset angle, to enable the second support plate to be fitted with the first support plate; and the first magnetic member is further configured to repel the second magnetic member in a case that the included angle between the first support plate and the bottom plate is greater than or equal to the preset angle, to enable the second support plate and the first support plate to be arranged at an included angle.

15. A foldable support, comprising:
a bottom plate;
a second rotary shaft;
a first support plate and a second support plate;
a rotary mechanism, wherein the rotary mechanism comprises a first support, a second support, a first rotary shaft, a cam, a shaft sleeve, and a conductive structure, the first support is connected to the bottom plate, the second support is connected to the first support plate, a first end of the first rotary shaft is connected to the first support, a second end of the first rotary shaft is connected to the second support, the second support is capable of rotating relative to the first support, the cam is sleeved to the first end of the first rotary shaft, the cam is capable of being driven by the first rotary shaft to rotate, the shaft sleeve is sleeved to a periphery of the cam, a first conductive contact point and a second conductive contact point that are arranged at an interval are arranged on an inner surface of the shaft sleeve, the conductive structure is connected to a peripheral side surface of the cam, and the conductive structure is capable of being driven by the cam to rotate to conduct with the first conductive contact point or the second conductive contact point; and
the first support plate is connected to the rotary mechanism through the bottom plate, the first support plate is capable of rotating relative to the bottom plate, the second support plate is connected to the first support plate through the second rotary shaft, the second support plate is capable of rotating relative to the first support plate, the second rotary shaft is connected to an end of the second support plate away from the rotary mechanism, and the second support plate is configured to match an external structural member to support the first support plate; and
a first magnetic member and a second magnetic member, wherein the first magnetic member is arranged on the first support plate, the second magnetic member is arranged on the second support plate, and the first magnetic member is configured to conduct with the first conductive contact point to attract the second magnetic member in a case that an included angle between the first support plate and the bottom plate is less than a preset angle, to enable the second support plate to be fitted with the first support plate; and the first magnetic member is further configured to conduct with the second conductive contact point to repel the second magnetic member in a case that the included angle between the first support plate and the bottom plate is greater than or equal to the preset angle, to enable the second support plate and the first support plate to be arranged at an included angle.

16. The foldable support according to claim 15, wherein the rotary mechanism further comprises a concave gear, the concave gear comprises a body and a clamping body connected to the body, the body is sleeved to the first end of the first rotary shaft, and the body is in contact with the cam, and an end of the clamping body away from the body is clamped with the first support.

17. The foldable support according to claim 16, wherein a protrusion is arranged on the cam, a groove is provided on the body of the concave gear, and the protrusion abuts against the groove.

18. The foldable support according to claim 16, wherein the rotary mechanism further comprises a first elastic member and a fastener, the fastener is fixedly connected to the first end of the first rotary shaft, and the first elastic member is sleeved to the first end of the first rotary shaft, and elastically abuts between the fastener and the cam.

19. The foldable support according to claim 16, wherein the rotary mechanism further comprises a fastener sleeved to the first end of the first rotary shaft, a first friction member, and a first elastic member, the fastener is fixedly connected to the first end of the first rotary shaft, the first friction member is located between the fastener and the first elastic member, and the first elastic member elastically abuts between the first friction member and the cam.

20. The foldable support according to claim 16, wherein the rotary mechanism further comprises a second friction member, and the second friction member is sleeved to the first end of the first rotary shaft, and is located between the concave gear and the first support;
the first support plate comprises a carrying surface and a support surface that face away from each other, the carrying surface is used for carrying a mobile terminal, an accommodation groove is provided on the support surface, and the accommodation groove is used for accommodating at least one part of the second support plate;
the foldable support comprises a keyboard, and the keyboard is connected to the bottom plate;
the foldable support further comprises a second elastic member, and the second elastic member is elastically connected between the first support plate and the second support plate.

* * * * *